US010661202B2

(12) United States Patent
Bentlohner et al.

(10) Patent No.: US 10,661,202 B2
(45) Date of Patent: May 26, 2020

(54) FILTER ELEMENT AND METHOD FOR PRODUCING THE SAME

(71) Applicant: Mann+Hummel GMBH, Ludwigsburg (DE)

(72) Inventors: Manuel Bentlohner, Marklkofen/Aiglkofen (DE); Ann-Kathrin Kleeberger, Frontenhausen (DE); Johannes Lampert, Landshut (DE); Hemambar Chilukuru, Marklkofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 1032 days.

(21) Appl. No.: 14/930,224

(22) Filed: Nov. 2, 2015

(65) Prior Publication Data

US 2016/0121242 A1   May 5, 2016

(30) Foreign Application Priority Data

Nov. 4, 2014 (DE) .......................... 10 2014 016 167

(51) Int. Cl.
*B01D 29/11* (2006.01)
*B01D 46/52* (2006.01)
(Continued)

(52) U.S. Cl.
CPC ............ *B01D 29/111* (2013.01); *B01D 29/11* (2013.01); *B01D 29/21* (2013.01); *B01D 39/18* (2013.01);
(Continued)

(58) Field of Classification Search
CPC .. B01D 29/111; B01D 29/21; B01D 46/2414; B01D 46/0001; B01D 46/521; B01D 2201/291; B01D 2201/293; B01D 46/0002; F02M 35/0201; F02M 35/02416; F02M 35/02458; F02M 35/02483; C08L 55/02; C08K 3/011; C08K 3/014; C08K 2003/282; C08K 3/06; C08K 2003/385; C08K 2003/309; C08K 5/42; C08K 5/01; C08K 5/3467; C08K 5/47; C08K 3/04;
(Continued)

(56) References Cited

U.S. PATENT DOCUMENTS 2,608,544 A * 8/1952 Brandt .................... C08K 5/01
524/485
3,219,515 A * 11/1965 Rice ...................... C08L 85/02
428/416

(Continued)

FOREIGN PATENT DOCUMENTS

DE     19935659 A1     2/2001
DE     10242682 A1     3/2004
DE     10242682 A1 *   3/2004  ............. B01D 29/07

*Primary Examiner* — Lucas A Stelling
*Assistant Examiner* — Angel Olivera
(74) *Attorney, Agent, or Firm* — James Hasselbeck

(57) ABSTRACT

A filter element (1), in particular for a motor vehicle, comprises at least one end cap (2, 3) and a filter medium (4) joined to the end cap (2, 3), wherein the at least one end cap (2, 3) comprises rubber and at least one heat-conducting additive. In a method for producing the filter element (1), at least one end cap (2, 3) is at least partially produced from rubber and a heat-conducting additive, wherein a thermal vulcanization process is carried out.

9 Claims, 2 Drawing Sheets

(51) Int. Cl.
- B01D 46/00 (2006.01)
- C08K 3/014 (2018.01)
- C08K 3/011 (2018.01)
- C08L 55/02 (2006.01)
- B01D 46/24 (2006.01)
- B01D 29/21 (2006.01)
- C08K 3/28 (2006.01)
- C08K 3/22 (2006.01)
- C08K 3/38 (2006.01)
- C08K 3/06 (2006.01)
- C08K 3/14 (2006.01)
- C08K 3/04 (2006.01)
- B01D 39/18 (2006.01)
- B29C 35/02 (2006.01)
- B60H 3/06 (2006.01)
- F02M 35/02 (2006.01)
- C08K 5/3467 (2006.01)
- C08K 5/01 (2006.01)
- C08K 5/42 (2006.01)
- C08K 3/30 (2006.01)
- F02M 37/50 (2019.01)
- F02M 37/22 (2019.01)
- F01M 11/03 (2006.01)
- C08K 5/435 (2006.01)
- C08K 5/44 (2006.01)
- C08K 5/47 (2006.01)
- C08K 5/39 (2006.01)
- C08K 5/38 (2006.01)

(52) U.S. Cl.
CPC ..... *B01D 46/0001* (2013.01); *B01D 46/2414* (2013.01); *B01D 46/521* (2013.01); *B29C 35/02* (2013.01); *B60H 3/06* (2013.01); *C08K 3/011* (2018.01); *C08K 3/014* (2018.01); *C08L 55/02* (2013.01); *F01M 11/03* (2013.01); *F02M 35/0202* (2013.01); *F02M 37/22* (2013.01); *F02M 37/50* (2019.01); *B01D 2201/291* (2013.01); *B01D 2201/293* (2013.01); *B01D 2221/14* (2013.01); *B01D 2258/06* (2013.01); *B01D 2275/203* (2013.01); *B01D 2279/60* (2013.01); *C08K 3/04* (2013.01); *C08K 3/06* (2013.01); *C08K 3/14* (2013.01); *C08K 5/01* (2013.01); *C08K 5/3467* (2013.01); *C08K 5/38* (2013.01); *C08K 5/39* (2013.01); *C08K 5/42* (2013.01); *C08K 5/435* (2013.01); *C08K 5/44* (2013.01); *C08K 5/47* (2013.01); *C08K 2003/2227* (2013.01); *C08K 2003/282* (2013.01); *C08K 2003/309* (2013.01); *C08K 2003/385* (2013.01)

(58) Field of Classification Search
CPC . C08K 5/435; C08K 5/38; C08K 5/44; C08K 5/39; C08K 3/14; C08K 2003/2227
See application file for complete search history.

(56) References Cited

U.S. PATENT DOCUMENTS

| | | | |
|---|---|---|---|
| 4,559,390 A * | 12/1985 | Watanabe | C08C 19/02 116/243 |
| 5,725,621 A * | 3/1998 | Pruette | B01D 46/0031 210/238 |
| 5,741,421 A * | 4/1998 | Erdmannsdoerfer | B01D 29/111 210/450 |
| 6,585,894 B1 * | 7/2003 | Gebert | B01D 29/111 210/493.2 |
| 2005/0022971 A1 * | 2/2005 | Collins | H01L 23/3737 165/80.3 |
| 2007/0270241 A1 * | 11/2007 | Sullivan | A63B 37/0003 473/371 |

* cited by examiner

FILTER ELEMENT AND METHOD FOR PRODUCING THE SAME

TECHNICAL FIELD

The present invention relates to a filter element. The invention further relates to a method for producing such a filter element.

While the present invention can be applied to arbitrary filter elements and systems, the present invention and the underlying object are described hereafter for a liquid filter or air filter of a motor vehicle. Folded or pleated filter materials, such as non-woven filters, which form a mini-pleat pack, are frequently used to filter a liquid or air for an internal combustion engine of a motor vehicle. For this purpose, an initially planar filter material sheet is folded in a zigzag-shaped manner. The mini-pleat pack is held by end caps, which are attached to the upper and lower faces of the cylindrical mini-pleat pack forming the filter medium. Such end caps can be made of plastic material, for example.

The joint between the mini-pleat pack and the end caps for handling and for connection to a fluid circuit must be fluid-tight. In the past, gluing, bonding or fusion processes have been used in the production of the corresponding filter elements. It is desirable to produce flexible end caps that are adapted to the particular filter application and join these to the particular filter medium with low complexity.

SUMMARY OF THE INVENTION

Against this background, it is the object of the present invention to create an improved filter element and an improved production method for a filter element.

Accordingly, a filter element, in particular for a motor vehicle, including at least one end cap and a filter medium that is joined to the end cap, is proposed, wherein the at least one end cap includes rubber and a heat-conducting additive, in particular in the raw material, wherein raw material preferably refers to the material of the end cap prior to thermal cross-linking.

In particular synthetic rubber, such as nitrile butadiene rubber (NBR), or nitrile rubber for short, styrene butadiene rubber (SBR), or mixtures thereof, are suitable for producing the rubber materials for a joint between the respective filter medium and, for example, further stabilizing elements of the particular end cap.

The end cap may have a multilayer composition, for example, wherein a section facing the filter medium may be designed as an adhesive layer or an adhesive film. The side of the end cap facing away from the filter medium can be made of plastic materials or other materials used in filter construction. A metal end cap is also conceivable, for example, which is attached to the filter medium by way of a rubber adhesive film. The end cap may also exclusively include the rubber material.

The filter element may be regarded as a semi-finished product, if the rubber material is not, or not fully, vulcanized. The vulcanization may be carried out with low complexity by way of the heat-conducting additive while increasing the temperature. To this end, heat is preferably applied into the material of the end cap or the rubber material, which is easy to do.

The heat-conducting additive may be electrically conducting, such as metal particles, graphite or the like, semi-conducting or also non-conducting. The heat-conducting additive is suitable for improving the transport of heat in the rubber material during vulcanizing and thereby promotes thermal vulcanization. In principle, oxides, carbides or nitrides are possible semiconducting or also non-conducting heat-conducting additives.

In embodiments of the filter element, the at least one end cap can include graphite or carbon black, in particular in a content of at least 10 PHR. Carbon additions result in electrical conductivity in subregions of the end cap. Moreover, they may increase the absorption of IR radiation due to the black color, which may be advantageous in particular for thermal vulcanizing using IR radiation.

When hereafter the end cap is mentioned, it shall be understood to mean in particular also an adhesive film for joining an outer end cap section to the filter medium.

Providing a heat-conducting additive improves in particular an application of heat by way of heating plates into the adhesive film so as to carry out the vulcanization process.

With the aid of the heat-conducting additive, it is possible to achieve vulcanization and improved cross-linking of the rubber. In this way, faster production becomes possible. An increase in volume of the rubber material is also more easily achieved, whereby improved "foaming" can take place. In particular, the heat-conducting additive improves the heat transport in the rubber material such that the heat from the heating plates is transported more quickly through the rubber material from the heating plates to regions of the rubber material lying furthest away from the heating plates.

A composition for a raw material for the end cap may further include the following:

The heat-conducting additive may in particular be carbon, in particular graphite, diamond, carbon black, metal particles, in particular iron, copper, silver and the like, hexagonal or cubic boron nitride, hexagonal or cubic aluminum nitride, aluminum oxide, in particular a-aluminum oxide, and/or silicon carbide. By way of the particular heat-conducting additive, improved thermal conductivity of the rubber material or of the particular end cap section is achieved, whereby accelerated curing and vulcanization within the scope of the manufacturing process can take place.

In embodiments of the filter element, the end cap, in particular in the form of an adhesive film, includes a vulcanization accelerator, in particular from the substance group of dithiocarbamates, sulfenamides and/or benzothiazoles. Zinc oxide may furthermore be added as an activator. In particular zinc dibenzyldithiocarbamate is used in embodiments. The vulcanization accelerator or a mixture of vulcanization accelerators is admixed to the rubber material.

Appropriate vulcanization accelerators can further simplify, and in particular accelerate, the production of the particular filter element. Use of the above-mentioned substances also improves the chemical resistance, for example with respect to working liquids in motor vehicle applications. A corresponding adhesive film in or on the end cap is particularly resistant to oil, fuels, urea solution or air, for example.

In embodiments, a raw material of the rubber, which is to say the pure and non-crosslinked rubber, has a Mooney viscosity between 10 and 80 MU. In particular embodiments, the Mooney viscosity is between 20 and 60 MU. The Mooney viscosity is measured by way of a Mooney viscometer.

In embodiments, at least one end cap is joined to the filter medium in a fluid-tight manner. A fluid-tight joint is achieved in particular when using the proposed rubber composition including the heat-conducting substance, vulcanization accelerators and/or phenolic resin, since foaming occurs already at relatively low temperatures, whereby the rubber material can conform around the pleat edges of the filter medium in a fluid-tight manner.

Furthermore a method for producing a filter element, in particular for a motor vehicle, is proposed, wherein the filter element includes at least one end cap produced least partially of rubber and a heat-conducting additive. In the method, a rubber mixture, for example by adding one or more vulcanization accelerators, in particular from the substance group of dithiocarbamates, sulfenamides and/or benzothiazoles and/or of zinc oxide as the activator, is vulcanized thermally, inductively, or by way of electromagnetic, in particular infrared, irradiation.

The produced filter element and the end cap are in particular designed as described above. In embodiments of the method, the raw material of the corresponding rubber mixture may furthermore be vulcanized by adding phenolic resin, sulfur, hexamethylenetetramine (urotropine) and/or a vulcanization accelerator.

The vulcanization is carried out thermally, for example, by irradiating infrared radiation or heat, for example by way of heating plates, onto the plate-shaped end caps, and in particular on the adhesive or joint region including the rubber. In embodiments of the invention, the heat irradiation for thermal vulcanization is carried out by induction or microwave irradiation. Inductive vulcanization is particularly favorable when the rubber material can be provided with electrically conductive or inductively heatable substances. Inductive heating is also conceivable.

Particularly homogeneously cross-linked rubber regions, for gluing or bonding the filter medium to further end cap materials, can be achieved by way of the above-described end caps.

In further embodiments, the at least one end cap includes a layer produced from a fiber-reinforced polyamide material. In this way, the end cap can be produced cost-effectively and has high strength.

In further embodiments, the at least one end cap is joined to the filter medium in a fluid-tight manner. In particular, the at least one end cap is glued or foamed to the filter medium by way of the rubber material.

In further embodiments, the at least one end cap has a rectangular geometry. The end cap is square, for example. Alternatively, the end cap may have a rounded, such as a circular, geometry.

The filter medium can have a pleated or undulated design. For example, known folds include zigzag folds or W-folds. The filter element may be embossed and subsequently be folded in a sharp-edged manner at embossing edges forming pleat edges. A planar filter material sheet, which undergoes the appropriate forming operation, may be used as the starting material.

The filter medium is a woven filter, a laid scrim filter, or a non-woven filter. The filter element can in particular be produced in a spun-bound non-woven or melt-blown method. The filter element may furthermore be felted or needled. The filter element can include natural fibers, such as cotton, or synthetic fibers, for example made of polyester, polyvinyl sulfite or polytetrafluoroethylene. During processing, the fibers can be oriented in, obliquely to and/or transversely to the machine direction. The filter element can be one-layer or multi-layer. The medium to be filtered is air, for example. A gaseous medium or air here also includes gas or air solids mixtures and/or gas or air liquids mixtures. Working liquids, such as fuels, lubricants, urea solutions and the like are also conceivable, which must be purified.

The filter element can be used in passenger cars, trucks, construction machines, watercraft, rail-borne vehicles, aircraft and, generally speaking, in air-conditioning technology, in particular in heating/air-conditioning equipment, in household appliances, in fuel cells, or in building engineering. These vehicles or craft can be operated electrically and/or by way of fuel (in particular gasoline, diesel or natural gas). With respect to building engineering, in particular stationary systems for treating air are possible.

The filter element is in particular designed as an oil filter or fuel filter and includes suitable filter media. A design as filter elements for a urea solution is also conceivable. The filter element may also form an air filter of an internal combustion engine of a motor vehicle or a cabin filter.

Additional possible implementations of the invention also encompass not explicitly described combinations of features or method steps described above or hereafter with respect to the exemplary embodiments. A person skilled in the art will also add individual aspects to the respective basic form of the filter element to improve or complement the same.

Further embodiments of the invention are the subject matter of the dependent claims and of the exemplary embodiments described hereafter. The invention will be described in more detail hereafter based on exemplary embodiments with reference to the accompanying figures.

DETAILED DESCRIPTION

Figure 1:
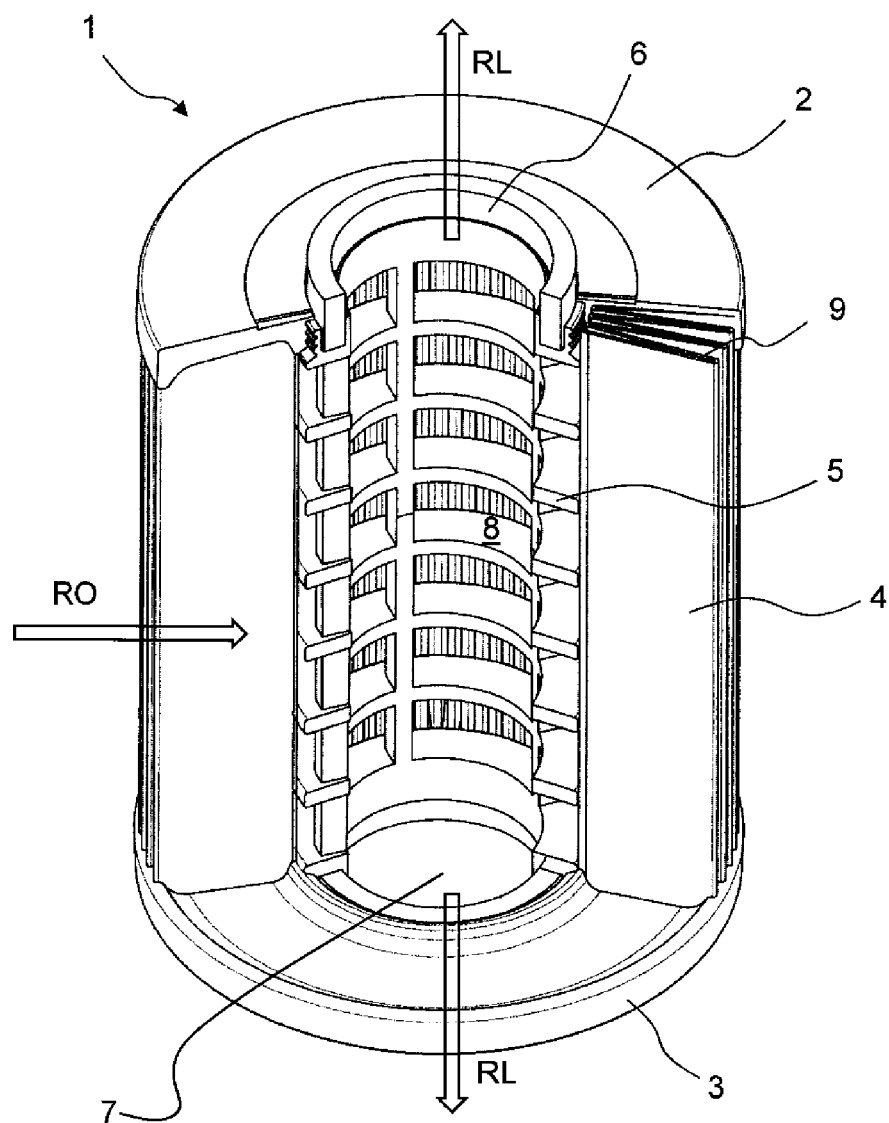
FIG. 1: shows a schematic perspective representation of one embodiment of a filter element for a motor vehicle.

FIG. 1 shows a schematic perspective representation of one embodiment of a filter element 1 for a motor vehicle. The filter element 1 can be an air filter or a liquid filter, in particular a fuel filter.

The filter element 1 includes a filter medium 4, which is designed as a mini-pleat pack composed of pleated filter material. Non-woven polymer materials folded in a zigzag-shaped manner are frequently used as filter materials. In the orientation of FIG. 1, an end cap 2, 3 is provided at a respective end side of the filter medium 4 on the upper face and lower face on pleat profiles 9 of the filter medium 4, which forms a continuous bellows. The filter element 1 includes at least one end cap 2, 3; preferably, however, it includes two end caps 2, 3. The end caps 2, 3 are joined to the filter medium 4 in particular in a fluid-tight manner. A bonded joint between the end caps 2, 3 and the filter medium 4 can take place, for example, such as by way of an adhesive film facing the filter medium 4. The end caps 2, 3 lend the filter element 1 a certain level of stability, allowing the same to be used in a corresponding fluid circuit. The filter medium 2 can be pressed into partially foamed material of the end caps 2, 3. A connector 6 forms part of the upper end cap 2, for example. Analogously, the lower end cap 3 can have an opening 7, which can serve as a connection.

In the orientation of FIG. 1, pleatedges 9 of the filter medium 4 are shown on the upper face. During operation, for example as an air filter or a liquid filter, the fluid to be filtered, such as air, flows through the filter surface, which is increased by the pleated filter material 4. The filter materials and geometries of the filter medium 4 or of the filter element 1 are generally adapted to a predefined flow direction. FIG. 1, for example, shows the untreated air RO from the side, and the filtered clean air RL upward and downward. In the orientation of FIG. 1, the surface facing the interior space 8 thus forms the outflow side, and the outer lateral surface of the cylindrical filter medium 4 forms the incident flow side of the filter element 1. An optional support element 5, which is present between the end caps 2, 3, is provided inside the bellows 4.

Figure 2:
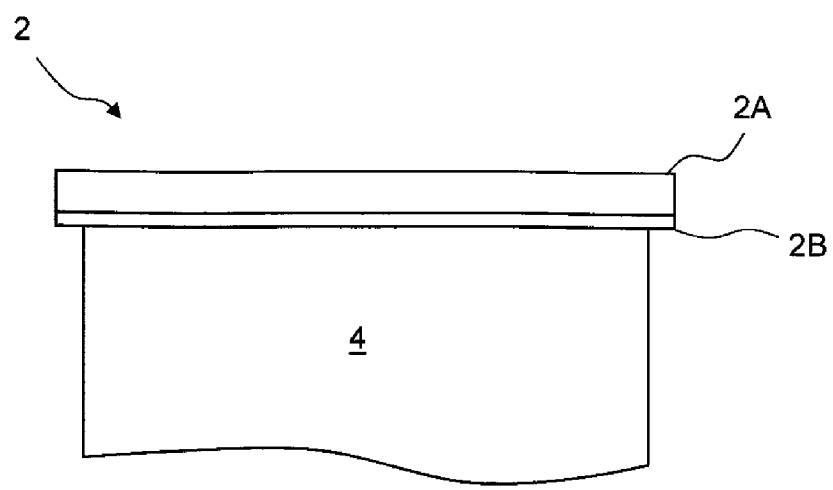
FIG. 2: shows a schematic representation of one embodiment of an end cap for a filter element.

FIG. 2 is a schematic representation of an end cap for a filter element. FIG. 2 shows an end cap 2 that includes multiple layers or sections. The end cap 2 has a carrier material 2A, for example a fiber-reinforced plastic material, which is joined to the filter medium 4 by way of a joining or gluing section 2B. The pleat edges 9 (see FIG. 1) are covered, so that fluid can flow exclusively through the filter medium 4 or the connections 6, 7. The adhesive section 2B can also be referred to as adhesive film. It may in particular be referred to as a film end cap when the end cap material is composed of a vulcanized rubber material, for example.

In the embodiment as shown in FIG. 2, a section 2B includes nitrile rubber (NBR) is provided, which is completely vulcanized during the course of the production method for a corresponding filter element 1. Vulcanizing is preferably carried out thermally, for example using vulcanization accelerators. Hereafter, it is referred to as an adhesive film 2B to simplify matters. Nitrile rubber is hereafter simply referred to as a rubber material by way of example. In principle, rubber materials in general are suitable for use in filter end caps.

The adhesive film 2B in particular forms part of the end cap 2 in the cured and cross-linked state. This is also referred to as a film end cap. In embodiments, the rubber raw material of the film end cap 2B is made of a rubber having a viscosity between 10 and 80 MU, and more particularly between 20 and 60 MU.

The adhesive film 2B is at least partially produced from nitrile rubber, a synthetic rubber. Nitrile rubber, or NBR, is substantially resistant to working fluids in the motor vehicle field, such as oils, greases, hydrocarbons, combustion air for engines, urea solution and the like.

So as to start a cross-linking reaction or the vulcanization, an activation energy $E_A$ must be overcome, wherein the reaction rate k is dependent on the temperature and described by way of the Arrhenius equation: $d(\ln k)/dT = E_A/R \cdot T^2$ (R: gas constant, T: temperature). A temperature increase thus drastically impacts the cross-linking rate. For this reason, a heat-conducting additive is introduced into the formulation of the raw substance for the end cap 2, which has a high thermal conductivity α. α is dependent on the heat conductivity λ, the density ρ, and the specific heat capacity c starting at: $\alpha = \lambda/(\rho \cdot c)$. At 1.18 $10^{-6}$ m²/s, graphite has a particularly favorable thermal conductivity, for example.

The NBR mixture of the adhesive film 2B includes a heat-conducting additive so as to accelerate thermal vulcanization. The heat-conducting additive is in particular carbon, metal powder, (hexagonal) boron nitride, (hexagonal) aluminum nitride, (α-)aluminum oxide and/or silicon carbide. PHR is understood to refer to the mass fraction of a particular mixture relative to the base polymer, which is in particular NBR here.

Optionally, it is possible to use vulcanization accelerators in particular from the substance group of dithiocarbamates, sulfenamides, benzothiazoles and/or zinc oxide as the vulcanization accelerator activator.

The applicant has analyzed various formulations for NBR-based adhesive films for use in filter elements as parts of end caps. A first preferred formulation includes at least one heat-conducting additive from the group consisting of: carbon (graphite, carbon black or diamond), boron nitride (white graphite), aluminum nitrite, aluminum oxide, silicon carbide, graphite, and carbon black combined with NBR rubber.

A second preferred formulation for filter end caps or filter adhesive films including rubber include the heat-conducting additives from the first formulation and at least one further vulcanization accelerator from the group of dithiocarbamates, sulfenamides and/or benzothiazoles.

A third formulation includes NBR rubber, at least one heat-conducting additive, and a vulcanization accelerator, as well as zinc oxide as the activator for the vulcanization process. 150 PHR graphite, 1 PHR zinc oxide, and 0.5 PHR zinc dibenyzldithiocarbamate in the NRB raw substance are conceivable.

A fourth formulation includes nitrile rubber including a vulcanization accelerator from the group of dithiocarbamates, sulfenamides and/or benzothiazoles. Furthermore, elemental sulfur, phenolic resin, hexamethylenetetramine (urotropine), at least one heat-conducting additive from the group consisting of carbon (graphite, carbon black or diamond), boron nitride, aluminum nitride, aluminum oxide and/or silicon carbide were admixed to the NBR. The fourth formulation furthermore optionally includes zinc oxide as the activator for the vulcanization accelerators that are used.

A fifth formulation includes the same substances as the first through fourth formulations and additionally provides for a substance as a processing aid, such as a tackifying agent or water. The end cap may be at least partially produced from a raw material that comprises a processing aid selected from: alkyl sulfonic acid esters and/or hydrocarbon mixtures. Pigments may optionally be added to adapt the color of the rubber.

In particular the proposed fourth and fifth formulations are suitable for appropriately adapting the hardness, elasticity and chemical properties of the end cap.

Heat-conducting additives are used in the described formulations in dosages between 10 and 150 phr. Phenolic resin is used in the described formulations in dosages between 20 and 250 phr. And vulcanization accelerators are used in the described formulations in dosages between 1 and 30 phr. If necessary, a vulcanization retarder may also be admixed so as to increase the storage stability.

The proposed formulations allow the vulcanization process to be used in a targeted manner. It has been shown that the heating time for thermal vulcanization is reduced over conventional adhesive film formulations. In addition, at least partial foaming takes place by way of the proposed film end caps or the adhesive films that are used, so that the respective end cap is joined to the pleat profiles or pleat edges in a fluid-tight manner.

During the production process of the corresponding filter elements, initially a filter medium is provided, to which the adhesive film is attached and which is subsequently thermally cured. For this purpose, the adhesive film is heated by the irradiation of energy. In this way, the rubber material is vulcanized, whereby the film and the filter medium are joined to each other. In particular, the vulcanized rubber material encloses the pleat edges or pleat profiles 8 (see FIG. 1).

As an alternative or in addition, the film may be used as an adhesive means between a further end cap material, as is shown in FIG. 2 as 2A, for example. The vulcanization is carried out in particular at temperatures between 50 and 350° C., and preferably between 120 and 160° C.

The duration of the vulcanization process ranges between 10 and 350 s in embodiments of the production method.

The proposed filter elements, film end caps, adhesive films, and production methods allow improved and simplified production of filter elements. By way of the described formulations, it is possible to achieve homogeneous cross-linking degrees in the rubber material.

While the present invention was described in more detail based on preferred exemplary embodiments, it is not limited to these, but may be modified in a variety of ways. The use of "a" or "an" does not exclude a plurality. It is moreover possible to add further substances to the NBR formulations, such as pigments or processing aids.

The invention claimed is:

1. A method for producing a filter element, wherein the filter element comprises:
    at least one end cap; and
    a filter medium joined to the at least one end cap;
   the method comprising the steps of:
    providing a filter medium of a woven or non-woven natural or synthetic fibers;
    pleating the filter medium into a plurality of zig-zag folds;
    providing an outer end cap layer of a fiber reinforced polyamide material for the at least one end cap;
    providing a raw nitrile butadiene rubber material;
    providing a heat-conducting additive selected to improve transport of heat during vulcanizing, the heat-conducting additive selected from the group consisting of: diamond, hexagonal or cubic boron nitride, hexagonal or cubic aluminum nitride, aluminum oxide, silicon carbide;
    wherein the heat-conducting additive further includes iron metal particles and graphite;
    mixing the heat-conducting additive into the raw nitrile butadiene rubber material to form raw curable nitrile butadiene rubber adhesive mixture, forming a curable nitrile butadiene rubber adhesive film;
    forming an uncured end cap comprising a curable nitrile butadiene rubber adhesive film from the raw curable nitrile rubber adhesive mixture by the steps of:
        applying the raw curable nitrile butadiene rubber adhesive mixture onto a filter medium facing side of the outer end cap layer;
        thermal vulcanizing and cross-linking the curable nitrile butadiene rubber adhesive film of the uncured end cap to for the at least one end cap by applying a heating energy by a means selected from the group consisting of: heating plates, induction heating, infrared radiation, or microwave radiation;
        wherein the thermal vulcanizing step includes:
            increasing volume of the curable nitrile butadiene rubber adhesive film by thermal foaming, the thermal foaming partially foaming the curable nitrile butadiene rubber adhesive film on the filter medium facing side of the outer end cap layer;
        pressing the filter medium into the partially foamed curable nitrile butadiene rubber adhesive film of the at least one end cap;
        continuing the thermal vulcanizing, increasing volume of the curable nitrile butadiene rubber adhesive film by thermal foaming, the thermal foaming conforming the curable nitrile butadiene rubber adhesive film onto pleat edges of the plurality of zig-zag folds of the filter medium; and
        forming a fluid-tight joint between the at least one end cap and the filter medium by the thermal foaming.

2. The method according to claim 1, wherein before the step of forming an uncured end cap, the method further comprises:
    adding at least one at least at least one vulcanization accelerator to the raw curable nitrile butadiene rubber adhesive mixture, the at least one vulcanization accelerator selected from the group consisting of:
    dithiocarbamates, xanthogenates, sulfenamides and/or thiazoles.

3. The method according to claim 1, wherein in the step of providing a raw nitrile butadiene rubber material, the raw nitrile butadiene rubber material includes zinc oxide as a vulcanization activator.

4. The method according to claim 1, wherein the raw curable nitrile butadiene rubber adhesive mixture includes a phenolic resin.

5. The method according to claim 1, wherein the raw curable nitrile butadiene rubber adhesive mixture includes hexamethylenetetramine.

6. The method according to claim 1, wherein the raw curable nitrile butadiene rubber adhesive mixture includes sulfur or sulfur compounds.

7. The method according to claim 1, wherein the raw curable nitrile butadiene rubber adhesive mixture includes a processing aid selected from the group consisting of: alkyl sulfonic acid esters and hydrocarbon mixtures.

8. The method according to claim 1, wherein before the step of forming an uncured end cap, the method further comprises:
    adding xanthogenates as a vulcanization accelerator to the raw curable nitrile butadiene rubber adhesive mixture.

9. The method according to claim 1, wherein the raw curable nitrile butadiene rubber adhesive mixture includes alkyl sulfonic acid esters as a processing aid.

* * * * *